United States Patent Office 3,247,355
Patented Apr. 19, 1966

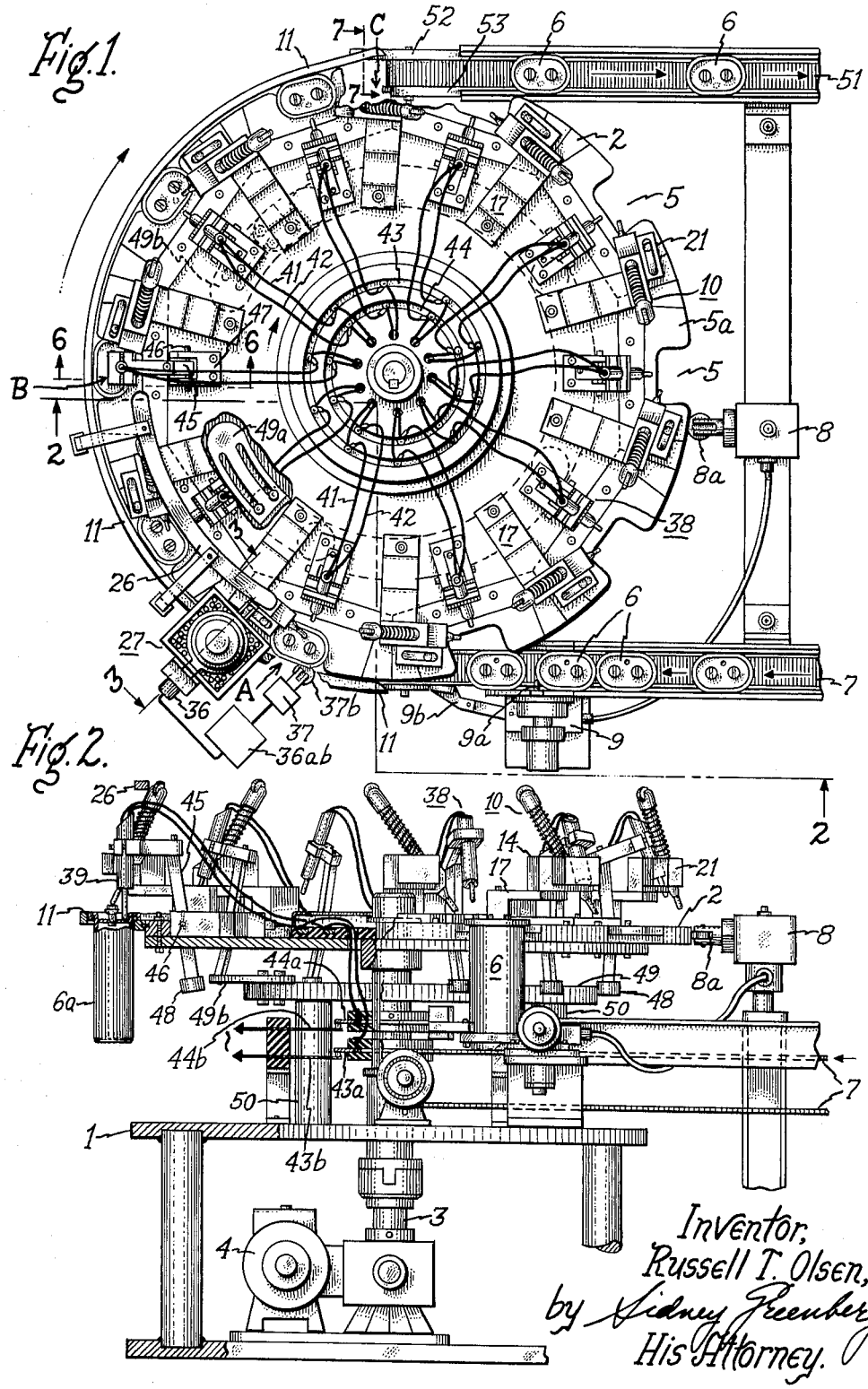

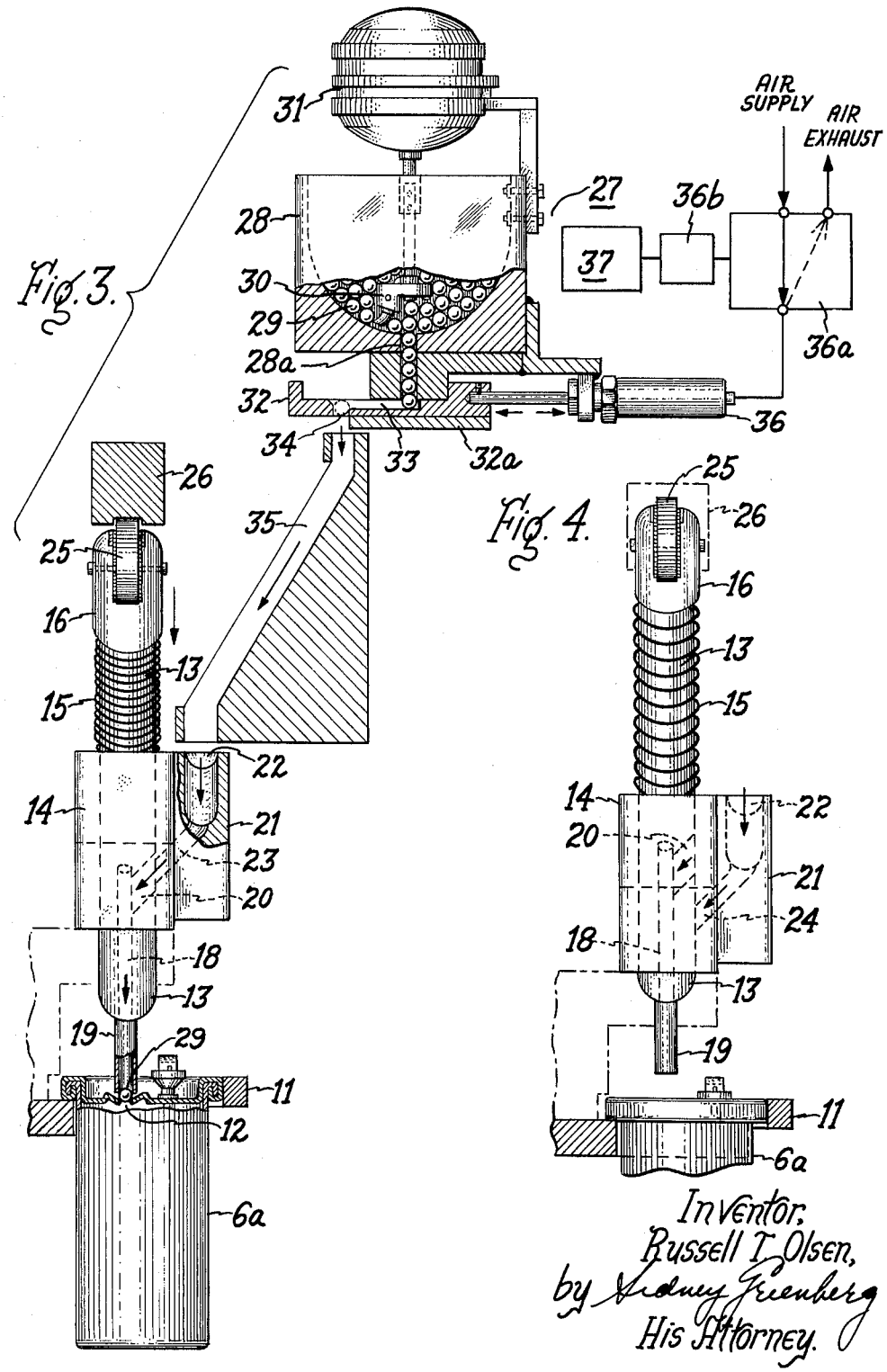

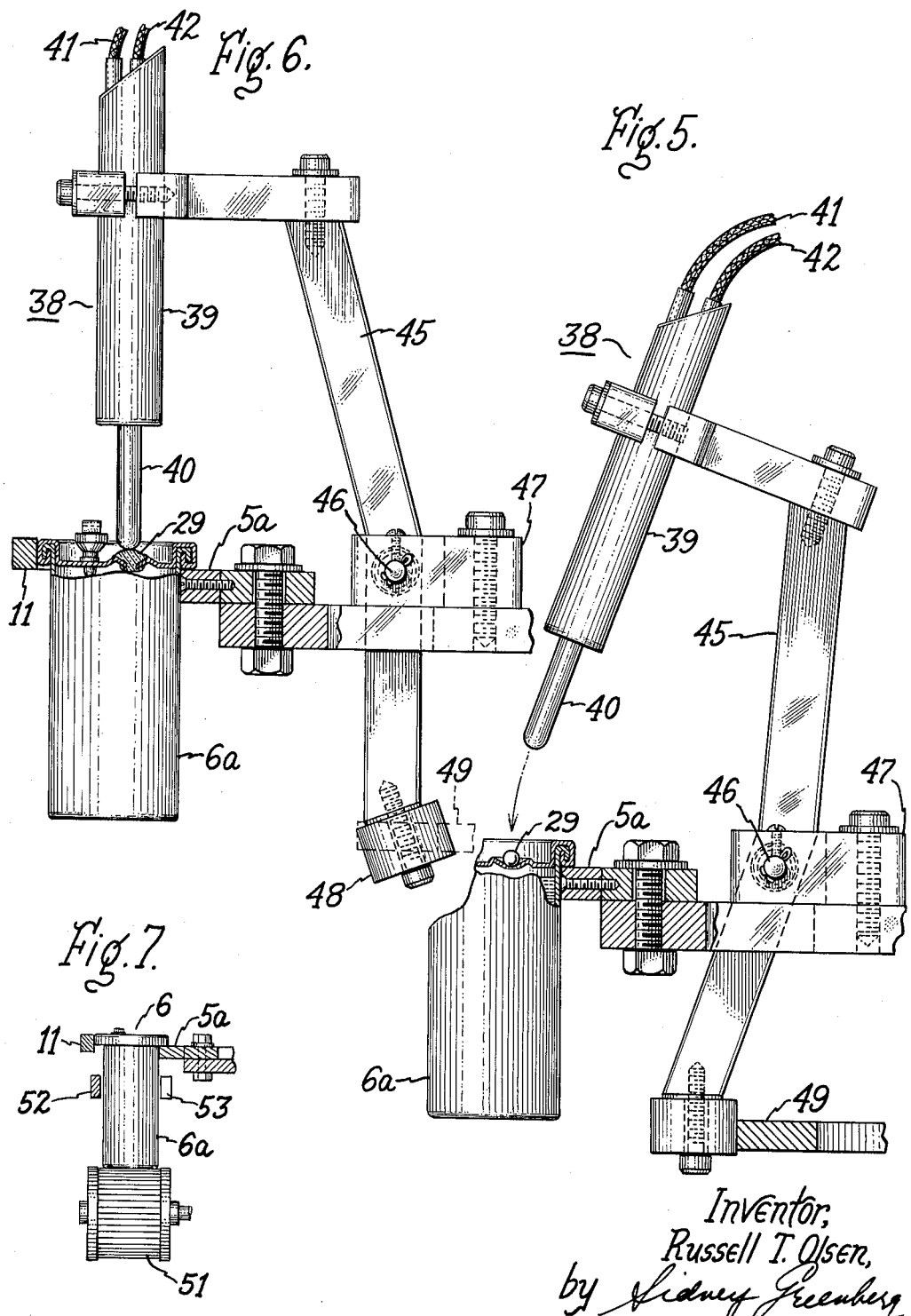

3,247,355
SOLDERING MACHINE
Russell T. Olsen, Bethlehem, Pa., assignor to General Electric Company, a corporation of New York
Filed Dec. 19, 1962, Ser. No. 245,835
5 Claims. (Cl. 219—85)

The present invention relates to soldering machines, and more particularly to apparatus for automatically solder sealing fill apertures in containers, such as electrical capacitor casings.

In the manufacture of many types of capacitors, the capacitor section is enclosed in a metal casing which is then closed by a metal cover having a fill aperture therein. Thereafter, the closed casing is subjected to a vacuum and immersed in a dielectric liquid, such as a chlorinated aromatic compound, which flows into the casing through the fill aperture in the cover and impregnates the contained capacitor section. Following this, the fill aperture is sealed, usually by the application of solder.

In the past, such solder sealing of the cover fill aperture has normally been done manually by an operator who fuses a portion of a solder wire in the aperture by means of a heated soldering iron. Such a procedure, however, is slow and relatively expensive and produces non-uniform results and high losses, as well as other disadvantages inherent in manual operations.

It is an object of the invention to provide an automatic soldering machine, and especially an apparatus of this type for sealing apertures in containers, particularly the cover fill apertures of electrical capacitors.

It is a particular object of the invention to provide apparatus of the above type for automatically applying solder material in the fill apertures of the containers and fusing the same therein to hermetically seal the containers, and for continuously and uniformly carrying out such operations on a plurality of articles of work continuously introduced into the apparatus.

Other objects and advantages will become apparent from the following description and the appended claims.

With the above objects in view, the present invention relates to automatic soldering apparatus comprising in combination movable support means having spaced work holding portions thereon, solder delivery means and solder melting means on the support means arranged at each of the work holding portions, each of the solder delivery means and solder melting means being movable between an operative position adjacent the work for respectively delivering and melting solder thereon and an inoperative position spaced away from the work, and means for automatically moving the solder delivery means and solder melting means into their operative positions in the proper sequence.

In a particular embodiment of the invention, solder supply means are arranged adjacent the movable support means which is rotatable and are operative to supply a solder piece to each of the solder delivery means as the latter passes during rotation of the support means adjacent the solder supply means and prior to placing the solder piece on the work.

The invention will be better understood from the following description taken in conjunction with the accompanying drawings in which:

FIGURE 1 is a plan view of an embodiment of the soldering machine of the invention;

FIGURE 2 is an elevational view partly in section of the FIGURE 1 apparatus taken along the line 2—2;

FIGURE 3 shows in elevation the solder supply and delivery mechanism of the FIGURE 1 apparatus, as viewed partly in section along the line 3—3 of FIGURE 1, showing the solder delivery mechanism in operative position;

FIGURE 4 is an elevational view of the solder delivery mechanism of FIGURE 3 showing the latter in inoperative position;

FIGURE 5 is an elevational view of the solder iron mechanism of the FIGURE 1 apparatus, showing the same in inoperative position;

FIGURE 6 is an elevational view of the solder iron mechanism of FIGURE 5 taken along the line 6—6 of FIGURE 1, showing the same in operative position; and FIGURE 7 is a cross-sectional, elevational view of the apparatus at the exit conveyor taken along the line 7—7 of FIGURE 1.

Referring now to the drawings, and particularly to FIGURES 1 and 2, there is shown an automatic soldering apparatus constructed in accordance with the invention for sealing with solder the fill apertures in metal cased capacitors. As shown, the apparatus comprises a fixed base 1 having a rotatable table 2 mounted thereon for turning about an axial shaft 3. Motor 4 is arranged for rotating shaft 3 and table 2 connected thereto in a clockwise direction as viewed in FIGURE 1. The periphery of table 2 is provided with cut-out portions 5 for receiving capacitors 6 as the latter are fed into the soldering apparatus on conveyor 7. Recesses 5 may be provided, as shown, by the attachment of templates 5a having the desired form and size of recess to the periphery of table 2.

To provide for properly timed placement of each capacitor 6 into the receiving recesses 5, a microswitch 8 with contact 8a is arranged adjacent table 2 so that contact 8a is actuated at intervals during rotation of table 2 as it rides into and out of the series of recesses 5. By this means microswitch 8 in turn actuates escapement mechanism 9 which has a retractable pin 9a and operates to permit a properly timed escape of each capacitor 6 so that it is carried by conveyor 7 into the next vacant recess 5 as table 2 rotates. Escapement mechanism 9 is also provided with an arm 9b movable toward and away from table 2 and the movement of which is timed to push the entering capacitor into its recess 5 to ensure proper seating therein. The particular construction of escapement mechanism 9 with its associated parts is not critical and does not form a part of this invention since any suitable escapement device can be used if desired. The escapement mechanism can, in fact, be omitted entirely by feeding the capacitors into the machine manually.

Extending around table 2 from the point at which the capacitors enter the apparatus to the point at which they leave is guard rail 11 which is arranged stationary closely adjacent the periphery of table 2 for holding the capacitors securely seated in their respective receiving recesses 5.

Mounted adjacent each capacitor receiving recess 5 by means of bracket 17 and support block 14 is a means for incremental delivery of solder or solder delivery device 10 for placing an individual solder pellet 29 (see FIGURE 3) into the fill aperture 12 of metallic capacitor can 6a. Optimum results are obtained by forming fill aperture 12 with a raised embossed rim sloping inwardly toward the aperture, as shown. In this way the sealing region is maintained above the level of the contained liquid impregnant, thus reducing harmful heat transfer to and vaporization of the capacitor dielectric liquid. Also, the sloping rim surface provides a means for centering the solder pellet in the desired location while affording a sufficiently large surface to increase the shear strength of the ultimate solder seal.

Solder delivery device 10 comprises a rod 13 slideably mounted at an angle in block 14, and urged upwardly by coil spring 15 surrounding rod 13 and held at its opposite ends between cap portions 16 and support block 14. Rod 13 has a passage 18 extending inwardly a substantial distance from its lower end and a nozzle portion 19 forming an outward extension thereof. Communicating with passage 18 is channel 20 which extends at an angle through the wall of rod 13. Secured to the outer side of block 14 is solder receiving block 21 which is formed with a cavity 22 in its upper surface and a conduit 23 leading at an angle downwardly from cavity 22 into and permanently aligned with opening 24 formed in the wall of block 14.

With rod 13 in its raised, inoperative position as shown in FIGURE 4, channel 20 is out of alignment with opening 24 and, consequently, solder receiving cavity 22 does not communicate with delivery passage 18. With rod 13 in its lower, operative position as shown in FIGURE 3, channel 20 is aligned with opening 24 and thus provides for communication between cavity 22 and passage 18 for delivery of a solder pellet to the work, as described hereinafter. Nozzle 19 is of such length and arranged at such angle that in its lower position, its bottom end is close to and just above fill aperture 12 so as to provide for accurate placement of a solder pellet therein.

Cap 16 of spring-loaded rod 13 is provided at its upper end with wheel 25 which is adapted to ride along the under surface of cam 26, the latter (as shown in FIGURE 1) being secured in a fixed position relative to rotating table 2 and extending in an arc along a predetermined portion of the path of wheel 25 as solder delivery device 10 travels on table 2. The under surface of cam 26 slopes upwardly at its opposite ends, so that as each solder delivery device 10 passes under cam 26 with its wheel 25 riding on the cam underside, rod 13 is depressed and assumes its operative lower position of FIGURE 3, and as wheel 25 rides off cam 26, rod 13 is raised and assumes its inoperative position as shown in FIGURE 4.

A solder supply mechanism 27, arranged in a fixed position adjacent the entrance end of cam 26, comprises hopper 28 for containing a supply of solder pellets 29 and having an opening 28a at its bottom only large enough for the passage of one solder pellet at a time. Agitator 30 rotatable by motor 31 is provided to prevent clogging of exit opening 28a by the solder pellets. Solder dispensing slide 32 arranged below opening 28a is formed with a slot 33 having an aperture 34 at one end. As shown, the depth of slot 33 is less than the diameter of the solder pellets, while the diameter of aperture 34 is only slightly larger than that of the solder pellets. Slide 32 is reciprocably movable on fixed base 32a, as shown by the arrows, between the pellet-dispensing position shown in FIGURE 3 and a pellet-receiving position wherein aperture 34 is directly below opening 28a. Chute 35 is arranged in fixed position relative to hopper 28 with its upper end aligned with aperture 34 when the latter is in its dispensing position. Reciprocation of slide 32 is provided by pneumatic moving means 36 to which air is supplied and from which it is exhausted by means of 3-way valve 36a, the latter being operated by solenoid 36b which in turn is actuated by microswitch 37 in timed relation to the rotation of table 2, such that slide 32 is moved to its solder dispensing position each time a solder-receiving block 21 is directly beneath the bottom of chute 35. In the illustrated embodiment, as shown in FIGURE 1, the switch contact member 37b of microswitch 37 is arranged to engage each capacitor can 6a as it reaches position A for moving slide 32 into its dispensing position.

Mounted on table 2 adjacent each solder delivery device 10, as seen in FIGURES 1 and 2, is a soldering device 38 which, as seen more clearly in FIGURES 5 and 6, comprises a heating element enclosed by housing 39 having a solder iron tip 40 projecting from its lower end. The heating element for solder tip 40 is connected to a source of current by lead wires 41, 42 to provide for heating of the iron, wires 41, 42 being connected to annular conducting rings 43, 44 on table 2 which in turn are respectively connected, as shown more clearly in FIGURE 2, to conducting rings 43a, 44a fixed to shaft 3 for rotation therewith. Stationary contact wipers 43b, 44b connected to a suitable current source (not shown) are arranged for sliding electrical contact with rings 43a, 44a, respectively, as the latter rotate with shaft 3. Soldering device 38 is secured to table 2 by means of support arm 45 which is pivotally connected by pin 46 to bracket 47 fixed to table 2. At its lower end, arm 45 is equipped with a cam roller 48 for riding on and coacting with cam rail 49 which is fixed to posts 50 on stationary base 1 and arranged underneath table 2 coaxial therewith. Cam rail 49 is substantially annular and is provided with a gap therein between its cam end portions 49a, 49b. The latter portions are constituted by slotted arc-shaped plates adjustably secured to and forming extensions of the spaced ends of cam rail 49 for the purpose of adjusting the length of the gap therebetween. As roller 48 of each soldering device 38 rides on cam rail 49 during rotation of table 2, soldering iron 40 is held in raised inoperative position as shown in FIGURE 5. When roller 48 reaches the aforementioned gap in cam rail 49, the weight of soldering iron 40 and associated parts causes arm 45 to pivot about 46 and soldering iron 40 drops into operative contact with the solder pellet placed in the capacitor cover as shown in FIGURE 6.

At the capacitor exit side of table 2, endless conveyor belt 51 is arranged to receive the sealed capacitors and carry them away as they leave the apparatus. As shown more clearly in FIGURE 7, guide rails 52, 53 extend along opposite sides of conveyor 51. Rail 53 is arranged with its end tangent to the path of travel of the capacitors, such that as each capacitor reaches rail 53, the latter deflects the capacitor out of its table recess 5 as table 2 continues to rotate, causing the capacitor to drop onto conveyor 51.

In the operation of the apparatus just described, capacitors each having a fill aperture 12 in their covers are loaded onto conveyor 7, and are individually released by escapement mechanism 9 into the vacant recesses 5 of table 2 which continuously rotates at a rate of, for example, 6 r.p.m. With each capacitor can properly seated in its recess 5 by means of arm 9b and maintained therein while on table 2 by guide rail 11, it first reaches position A (see FIGURE 1). During this time both solder delivery device 10 and soldering device 38 are in raised, inoperative position. With the capacitor can at position A, its associated solder delivery rod 13 is depressed by cam 26 as it travels thereunder so that, as shown in FIGURE 3, the solder pellet conduits in rod 13 and blocks 14 and 21 are aligned. At about the same time, by virtue of switch contact 37b engaging the capacitor can in position A, slide 32 moves automatically to its dispensing position and drops a single solder pellet 29 into chute 35, the pellet then falling through the aforementioned aligned conduits and nozzle 19 into place in the fill aperture 12 in the capacitor cover. After dispensing the single solder pellet, slide 32 by virtue of switch contact 37b leaving its engagement with the capacitor can is retracted to its solder receiving position to permit another solder pellet to drop into slotted aperture 34 preparatory to the next movement of slide 32 to its dispensing position. Continued movement of the capacitor past position A results in rod 13 riding off cam 26 and moving upwardly under the urging of its coil spring 15 into inoperative position away from the capacitor cover. Thereafter, the capacitor can arrives at position B, at which point cam roller 48 of its associated soldering device 38 has entered the gap in cam rail 49. As a result, soldering device 38 which has been maintained in heated condition by the electrical connection described, drops toward the capacitor cover until tip 40 comes into contact with solder pellet 29, and fuses it in aperture 12 in sealing relation with the capacitor cover. As table 2 continues to rotate, cam roller 48 of soldering device 38 again engages cam rail 49 and causes solder device 38 to pivot into raised inoperative position away from the capacitor cover.

As the sealed capacitor can reaches position C at the exit side of the apparatus, it engages rail 53 and, as previously described, is deflected and moved thereby out of recess 5 and drops onto conveyor 51 moving in the direction shown by the arrows.

There is thus provided by the invention an automatic soldering machine which avoids the disadvantages of manual operation of soldering processes, provides uniform solder seals, reduces the cost of solder material required in the sealing operation and manufacturing losses in such operations, is adaptable for sealing articles of varying forms and sizes, and is capable of high capacity production.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. In an automatic soldering apparatus the combination comprising: a moveable support means having spaced work-holding portions thereon; a solder delivery means for supplying incremental portions of solder and a solder melting means located on said support means at each of said work-holding portions, said solder delivery means comprising a solder receiving member and a solder placement member moveable with respect to said solder receiving member between an upper inoperative position away from the work and a lower operative position closely adjacent the work, said solder receiving member and said solder placement member having solder conduits aligned to allow passage of a piece of solder therethrough to the work only when said solder placement member is in its lower operative position, said solder melting means being moveable between an operable position adjacent the work to melt the solder supplied by said delivery means and an inoperative position spaced away from the work; and actuating means for respectively moving said solder delivery means and said soldering melting means into their operative positions for delivering a piece of solder to the work and fusing the same thereon.

2. An automatic soldering apparatus as recited in claim 1 and further comprising: a stationary solder supply hopper arranged above said solder receiving member; solder dispensing means arranged below said supply hopper for transferring pieces of solder individually from said supply hopper to said solder receiving member; and means for automatically actuating said solder dispensing means for transferring a piece of solder to said placement member via said receiving member when said placement member is in its operative position.

3. In an automatic soldering apparatus the combination comprising: a moveable support means having spaced work-holding portions thereon; a solder delivery means for supplying incremental portions of solder and a solder melting means located on said support means at each of said work-holding portions, said solder delivery means comprising a solder receiving member and a solder placement member moveable with respect to said solder receiving member between an upper inoperative position away from the work and a lower operative position closely adjacent the work, said solder receiving member and said solder placement member having solder conduits to allow passage of a piece of solder therethrough, said solder melting means being moveable between an operative position adjacent the work to melt the solder supplied by said solder delivery means and an inoperative position spaced away from the work; a first cam actuating means for moving said solder placement member to align the solder conduits of said solder receiving member and said solder placement to deliver a piece of solder to said work and thereafter moving said solder placement member to its upper inoperative position away from the work so that said solder conduits are no longer aligned; and a second cam actuating means for moving said solder melting means into its operative position in contact with the thus delivered solder piece for fusing the latter on the work and thereafter moving said solder melting means into its inoperative position away from the work.

4. An automatic soldering apparatus as recited in claim 3 wherein: said solder melting means is connected to said movable support means by a pivoted support arm; a cam roller located on the end of said support arm away from said solder melting means; a circular cam rail having a gap therein, said cam roller coacting with said cam rail to move said solder melting means into its operative position in contact with a delivered solder piece for fusing the latter on the work and thereafter move said solder melting means into its inoperative position away from the work.

5. An automatic soldering apparatus as recited in claim 4, and further comprising: a stationary solder supply hopper arranged above said solder receiving member; and solder dispensing means arranged below said supply hopper for transferring pieces of solder individually from said supply hopper to said solder receiving member; and means for automatically actuating said solder dispensing means for transferring a piece of solder to said placement member via said receiving member when said placement member is in its operative position.

References Cited by the Examiner

UNITED STATES PATENTS

| | | | |
|---|---|---|---|
| 1,743,519 | 1/1930 | Bardet et al. | 219—85 |
| 1,749,684 | 3/1930 | Wright | 219—85 |
| 1,876,821 | 9/1932 | Dugan | 219—85 |
| 2,748,738 | 6/1956 | McGowan et al. | 113—94 X |
| 2,999,614 | 9/1961 | Kingsley et al. | 221—13 |
| 3,061,144 | 10/1962 | Brewer et al. | 221—13 |

RICHARD M. WOOD, *Primary Examiner.*